United States Patent [19]
Riedel

[11] 3,771,704
[45] Nov. 13, 1973

[54] FILM GUIDE MEANS FOR CINEMATOGRAPHIC APPARATUS

[75] Inventor: Wolfgang Riedel, Winnenden, Germany

[73] Assignee: Robert Bosch GmbH, Stuttgart, Germany

[22] Filed: Mar. 9, 1972

[21] Appl. No.: 233,081

[30] Foreign Application Priority Data
Mar. 24, 1971 Germany.................. P 21 14 242.7

[52] U.S. Cl..................... 226/89, 226/91, 226/195, 242/75.2, 352/157
[58] Field of Search................... G03b/1/56; 226/39, 226/89, 195, 91; 242/75.2; 382/182, 157, 158

[56] References Cited
UNITED STATES PATENTS

| | | | |
|---|---|---|---|
| 1,839,470 | 1/1932 | Eitzen | 226/195 X |
| 1,972,456 | 9/1934 | Newman | 226/39 |
| 3,097,777 | 7/1963 | Floyd | 226/39 |
| 3,201,020 | 8/1965 | Cherniavskyj | 352/158 |

Primary Examiner—Richard A. Schacher
Attorney—Michael S. Striker

[57] ABSTRACT

A motion picture projector wherein the means which guides the leader of motion picture film during threading from the inlet opening into the range of the claw pull-down includes a resilient braking member which normally bears against a stationary guide member adjacent to the inlet opening. When the leader of a fresh film is inserted into and through the inlet opening, the leader lifts the braking member off the stationary guide member and the braking member thereupon prevents withdrawal of the leader due to its tendency to curl by biasing the leader against the guide member. Once the leader reaches the pull-down so that the latter begins to transport the film in stepwise fashion, the resulting tensioning of the film causes the braking member to move further away from the stationary guide member and to bear upon the tensioned film so as to compensate for the fact that the supply reel from which the film is being withdrawn normally rotates without stoppage while the pull-down transports the film stepwise.

9 Claims, 1 Drawing Figure

PATENTED NOV 13 1973    3,771,704
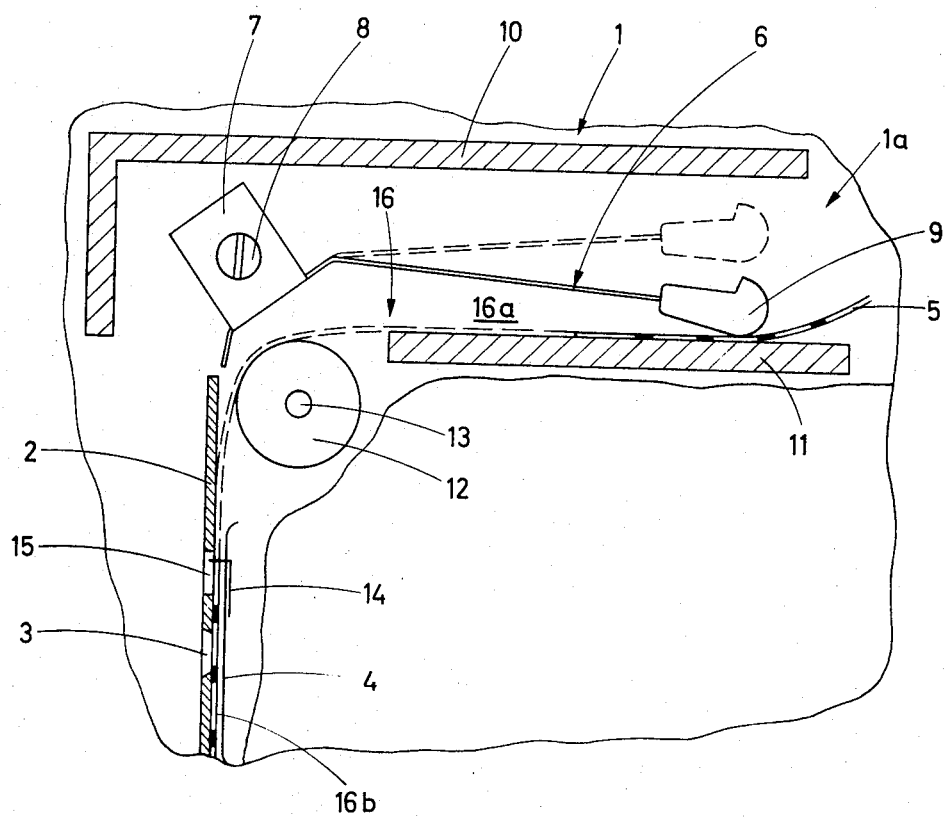

FILM GUIDE MEANS FOR CINEMATOGRAPHIC APPARATUS

BACKGROUND OF THE INVENTION

The present invention relates to improvements in cinematographic apparatus, and more particularly to improvements in guide means wherein motion picture film advances between a supply reel or an analogous source and the region where successive frames of the film are traversed by a beam of light, especially a beam of projection light in a motion picture projector. Still more particularly, the invention relates to improvements in cinematographic apparatus of the type wherein the guide means does not embody any film transporting means between the supply of convoluted film and the customary film feeding mechanism which transports the film stepwise in the region of the aperture for the passage of light.

A drawback of presently known guide means for motion picture film in cinematographic apparatus wherein the leader of a freshly introduced film must be advanced by hand into the range of the film feeding mechanism in the region of the aperture is that the leader is likely to curl and to resist the introduction through and beyond the inlet opening of the housing. Therefore, the user of the apparatus must manipulate the film with two hands in order to insure that the leader is caused to advance into the range of the film feeding mechanism. The tendency of the leader to curl is particularly pronounced if the film is stored on a reel for relatively long periods of time.

SUMMARY OF THE INVENTION

An object of the invention is to provide novel and improved guide means which can guide the leader of a motion picture film into the range of the film feeding mechanism in a cinematographic apparatus and which is constructed and assembled in such a way that the user can readily introduce the leader of a fresh film into the path defined by the guide means by utilizing one hand and without the danger that the leader would escape from the path while the film is temporarily released so that the user can grip the film behind the leader.

Another object of the invention is to provide guide means which can confine the film in the just outlined manner with a minimal outlay in parts and without occupying more room than heretofore known guide means.

A further object of the invention is to provide a cinematographic apparatus with a novel braking or compensating member which preferably forms part of the improved guide means and additionally serves to compensate for the fact that the supply reel normally rotates without interruptions while the film is being fed stepwise to place successive film frames into register with the aperture for the passage of light.

The invention resides in the provision of a combination which is embodied in a cinematographic apparatus, particularly in a motion picture projector, and comprises a housing having an inlet opening for admission of the leader of a supply of motion picture film, a film transporting device including a claw pull-down or an analogous movable film engaging member which is mounted in the housing in the region of the aperture and is spaced apart from the inlet opening, guide means defining in the housing an elongated path for the movement of the film from the inlet opening toward and past the film engaging member and comprising a preferably fixedly mounted guide member adjacent to the inlet opening at one side of a portion of the film path, and a braking member which preferably forms part of the guide means and is provided in the housing at the other side of the aforementioned portion of the film path for movement to and from a normal idle position in which, in the absence of film in the respective portion of the path, the braking member abuts and preferably bears with slight pressure against the guide member. Thus, when the leader of a fresh supply of film is introduced between the braking member and the guide member, the braking member presses the leader against the guide member and prevents it from leaving the path so that the user can temporarily release the film to grip a film portion behind the leader and to push it toward the braking member whereby the leader advances into the range of the film engaging member.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary longitudinal vertical sectional view of a motion picture projector including film guide means which embodies the invention.

DESCRIPTION OF THE PREFERRED EMBODIMENTS

The drawing illustrates a portion of a motion picture projector which comprises a housing 1 having an inlet opening 1a for admission of the leader of a fresh supply of motion picture film 5. Such film is normally convoluted on the core of a supply reel (not shown) which may but need not be stored in a cassette or an analogous magazine. The housing 1 accommodates and/or supports novel guide means which defines an elongated path 16 wherein the leader of a freshly inserted film 5 must be advanced by hand into the range of a film engaging member 14 here shown as a claw-pull-down and forming part of a known transporting device which moves successive frames of the film 5 into register with an aperture 3 for projection light. The path 16 includes two mutally inclined portions 16a, 16b the first of which is adjacent to the inlet opening 1a and the second of which extends along and beyond the pull-down 14. The guide means comprises a plate-like stationary guide member 11 which is adjacent to one side of the path portion 16a relatively close to the inlet opening 1 a and is followed by an idler roll 12 mounted on a shaft 13 which is secured to the housing 1. The guide means further comprises a second plate 2 which is adjacent to the front side of the path portion 16b and is provided with the aforementioned aperture 3 as well as with a window 15 for the claw of the pull-down 14. A customary pressure plate 4 is mounted in the housing 1 behind the aperture 3 to insure that the film frame which registers with the aperture is maintained in a predetermined plan during the passage of projection light.

In accordance with a feature of the invention, the projector further comprises a novel braking or damping member 6 which is adjacent to the path portion 16a opposite the guide member 11 and below a wall 10 of the housing 1. The braking member 6 is a leaf spring one end portion of which is anchored in a block 7 fixedly secured to the housing 1 by a screw 8 or an analogous fastener. The other end portion of the braking member 6 is provided with or forms a pressure pad or shoe 9 which normally tends to assume an idle position (indicated by solid lines) in which its convex surface abuts and preferably bears against the adjacent surface of the guide member 11. The block 7 is mounted in the housing 1 opposite the idler roller 12. The parts 10 and 11 can constitute two internal ribs of the housing 1. The mounting of the block 7 is preferably such that the pressure pad 9 bears against the guide member 11 with a slight pressure which suffices to flatten the leader of a freshly inserted film.

In order to introduce the leader of a fresh supply of motion picture film 5 into the projector, the user grips the leader of such film and inserts it through the inlet opening 1a and between the pressure pad 9 and the guide member 11. If the leader is thereupon released so that the user can grip the film behind the leader in order to push the film lengthwise and toward the idler roller 12, the pad 9 biases the leader against the adjacent surface of the guide member 11 so that the leader cannot curl and eventually escape through the inlet opening 1a. The film is threaded along the path 16 in that the user repeatedly grips and releases successive portions of the film outwardly of the inlet opening 1a and pushes the film lengthwise until the leader reaches the claw of the pull-down 14. The latter thereupon begins to advance the film 5 in stepwise fashion and moves successive film frames into register with the aperture 3. The window 15 may be an elongated slot which allows the claw to move downwardly, as viewed in the drawing, to the extent which is necessary to advance the film stepwise, always by the length of a frame. The main portion of the braking member 6 guides the leader of a freshly inserted film 5 during travel toward and along the idler roller 12 and into engagement with the rear side of the plate 2.

Once the leader of the film 5 is engaged by the claw of the pull-down 14, the tension of the film between the window 15 and the supply reel increases so that the film portion between the inlet opening 1a and the roller 12 tends to move in a straight line with the result that the braking member 6 yields and its pressure pad 9 assumes the position which is indicated by broken lines. The braking member 6 then begins to perform its normal function, namely, to compensate for the fact that the supply reel normally rotates without interruptions while the pull-down 14 transports the film 5 in stepwise fashion.

It will be noted that the braking member 6 performs two important functions. During threading of a fresh film, it forms part of the guide means and prevents the leader from leaving the portion 16a of the film path 16 while the leader is not positively held by the user's hand. During normal operation of the projector, the pressure pad 9 of the braking member 6 bears against the film to prevent the substantially continuous unwinding of film off the supply reel from influencing the stepwise transport of film in the region of the aperture 3. Thus, the escape of the film leader during threading is prevented by a slight change in the mounting and configuration of a part (braking member) which is thereupon used to perform its normal function when the projector is in use.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended

1. In a cinematographic apparatus, particularly in a motion picture projector, a combination comprising a housing having an inlet opening for admission of the leader of a supply of motion picture film; a film transporting device provided in said housing and including a movable film engaging member spaced apart from said inlet opening and operable to intermittently transport the film lengthwise whereby the tension of film varies between a higher tension in the course of film transport and a lower tension between successive film transports; guide means defining in said housing an elongated path for the movement of film from said inlet opening toward and past said film engaging member, said guide means comprising a guide member adjacent to said inlet opening at one side of a portion of said path; and a damping member provided in said housing at the other side of said portion of said path and being movable to and from a normal idle position in which, in the absence of film in said portion of said path, said damping member abuts against said guide member, said damping member being arranged to bias the film in said portion of said path against said guide member during introduction of the leader of film into the range of said movable film engaging member and being resiliently responsive to variations in film tension resulting from operation of said film engaging member so as to yieldably bias the film in said portion of said path toward said guide member and to normally assume one of a plurality of second positions in the course of film transport by said film engaging member.

2. A combination as defined in claim 1, wherein said damping member forms part of said guide means.

3. A combination as defined in claim 1, wherein said damping member comprises a first end portion secured to said housing and a second end portion which constitutes a pressure pad and bears against said guide member in the idle position of said damping member.

4. A combination as defined in claim 1, wherein at least a portion of said damping member consists of resilient material.

5. A combination as defined in claim 4, wherein said damping member is a leaf spring.

6. A combination as defined in claim 1, wherein said guide member is fixedly secured to said housing.

7. A combination as defined in claim 1, wherein said guide means further comprises an idler roller adjacent to a second portion of said path located between said first mentioned portion and said film engaging member at said one side of said path.

8. A combination as defined in claim 1, wherein said film engaging member is a claw pull-down.

9. A combination as defined in claim 1, wherein said film engaging member is adjacent to a second portion of said path which is inclined with reference to said first mentioned portion.

* * * * *